(12) United States Patent
DeCaro et al.

(10) Patent No.: US 6,323,966 B1
(45) Date of Patent: Nov. 27, 2001

(54) DIGITAL SCANNER

(75) Inventors: Joel D. DeCaro, Brockport; Clayton G. Johnson, Spencerport; Thomas W. Mort, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/329,041

(22) Filed: Jun. 9, 1999

Related U.S. Application Data

(63) Continuation-in-part of application No. 09/216,373, filed on Dec. 18, 1998.

(51) Int. Cl.[7] .................................................. H04N 1/04
(52) U.S. Cl. ........................ 358/475; 358/484; 358/487
(58) Field of Search ................................ 358/475, 474, 358/484, 509, 506, 487; 355/67, 75, 71, 35, 37; 399/217, 220, 221

(56) References Cited

U.S. PATENT DOCUMENTS

| | | | |
|---|---|---|---|
| 4,227,804 | 10/1980 | Pramstraller | ............................ 355/67 |
| 4,893,149 | 1/1990 | Satou et al. | ............................ 355/67 |
| 5,572,286 | * 11/1996 | Morita et al. | ........................... 355/35 |
| 5,617,184 | * 4/1997 | Kuwayama et al. | ................... 355/75 |

* cited by examiner

*Primary Examiner*—Cheukfan Lee
(74) *Attorney, Agent, or Firm*—Frank Pincelli

(57) ABSTRACT

An apparatus and light conduit for scanning a media which uses a low light illumination system for providing an exposure light for illuminating a media on to a sensor for capturing images on the media. A gate assembly slidably is mounted to the apparatus. A light conduit is mounted to the clamp member and has an outwardly extending lip about one opening at one end which mates with a channel provided in the illumination system. The conduit is provided with a reflective surface to improve the efficient use of the available light.

18 Claims, 8 Drawing Sheets

DIGITAL SCANNER

CROSS-REFERENCE TO RELATED APPLICATION

This is a continuation-in-part of application Ser. No. 09/216,373, filed Dec. 18, 1998, entitled DIGITAL SCANNER, by Joel D. DeCaro, Clayton G. Johnson and Thomas W. Mort.

FIELD OF THE INVENTION

The present invention is directed to a digital scanner, more particularly to a digital scanner which uses a low illumination source for illuminating a film having an image thereon for exposure onto a CCD array.

BACKGROUND OF THE INVENTION

Today's digital scanners are particularly designed to receive a single format media which is to be scanned. In order to accommodate various different sizes, there is typically provided a removable gate which allows the use of a second gate of a second format. However, use of replaceable gate assemblies presents problems, particularly with a low light system. In a low light illumination system it is critical that stray (outside ambient) light not enter the field of exposure. It is also important to efficiently use the light available for any size media.

Thus, there is a need to provide a digital scanner capable of being easily switched between more than one format, yet be of a construction which will not allow stray light to interfere with the exposure of the CCD sensor used to capture the image.

SUMMARY OF THE INVENTION

In accordance with the present invention there is provided an apparatus for scanning a media, comprising:

a sensor for receiving an exposure of an image;

a low light illumination system for providing an exposure light comprising a low light source and an integration chamber for receiving light from said light source, said integration chamber having an exit opening for allowing said exposure light to exit said integration chamber; and a gate assembly slidably mounted to the apparatus, said gate assembly having a frame member having an exposure aperture which is in optical alignment with said sensor and said exit opening such that said exposure light will pass through a media positioned at said exposure aperture on to said sensor, a clamp member moveably mounted to said frame member between an exposure position and a non-exposure position, and a light conduit mounted to said clamp member, said light conduit having a first opening at one end adjacent said exposure aperture and a second opening at the other end disposed adjacent said exit opening, said first opening having a configuration equal to or greater than said exposure aperture, said second end having an outwardly extending lip which extends around at least a portion of said second opening and having a configuration such that it mates within said exit opening, said lip having a reflective surface for reflecting a portion of light back into said integration chamber for increasing of the brightness for exposure onto the media.

In accordance with another aspect of the present invention there is provided a light conduit for use in an apparatus for scanning the media having a light integrator having an exit opening and means for receiving and holding a light conduit for directing light from some integration chamber through said conduit, said conduit having a reflective surface designed for reflecting a portion of light exiting said opening and said integration chamber back into said integration chamber for increasing the brightness of the light passing through said conduit.

DETAILED DESCRIPTION OF THE INVENTION

Figure 1:
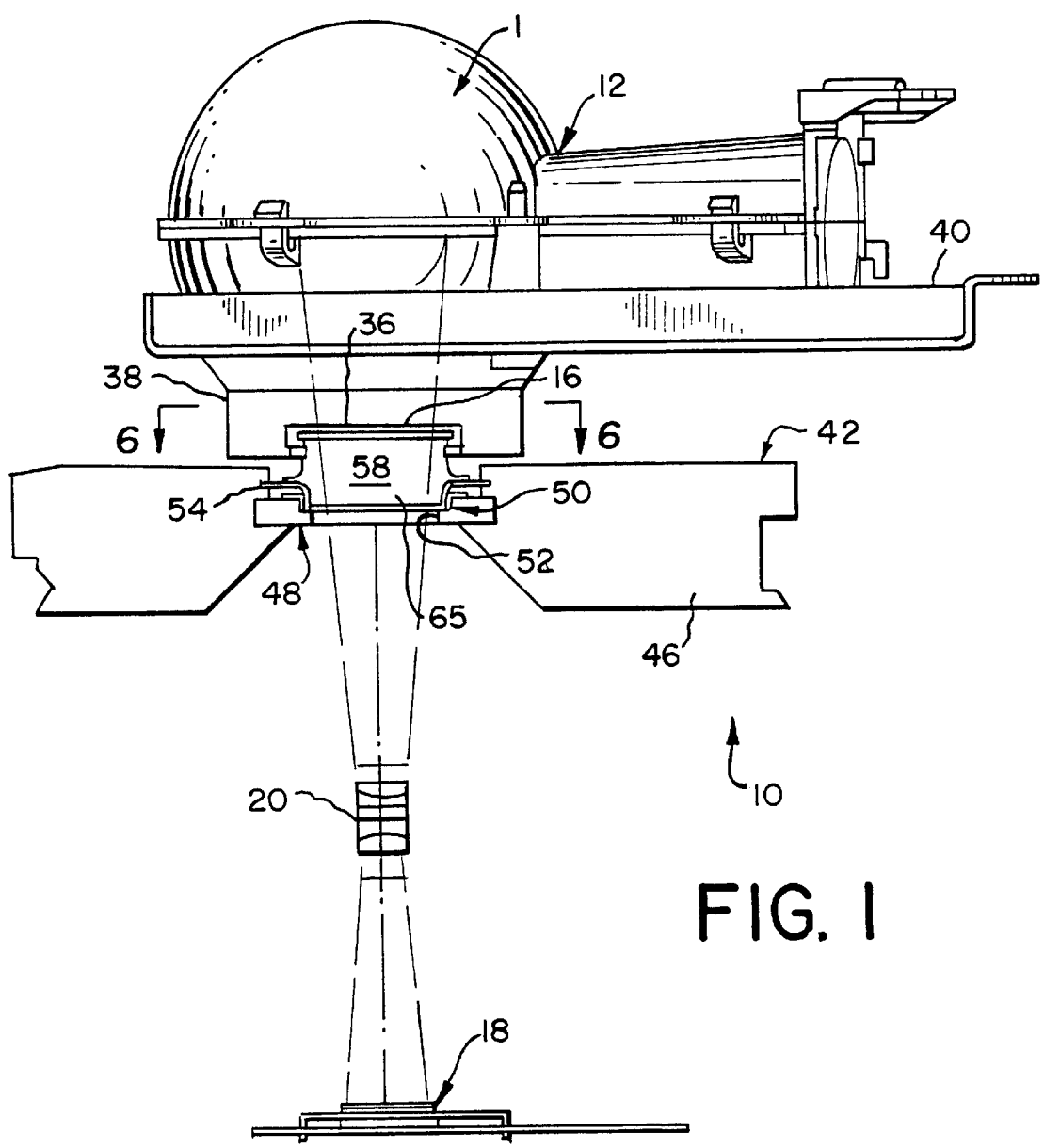
FIG. 1 is an elevation view of an apparatus made in accordance with the present invention.
Figure 2:
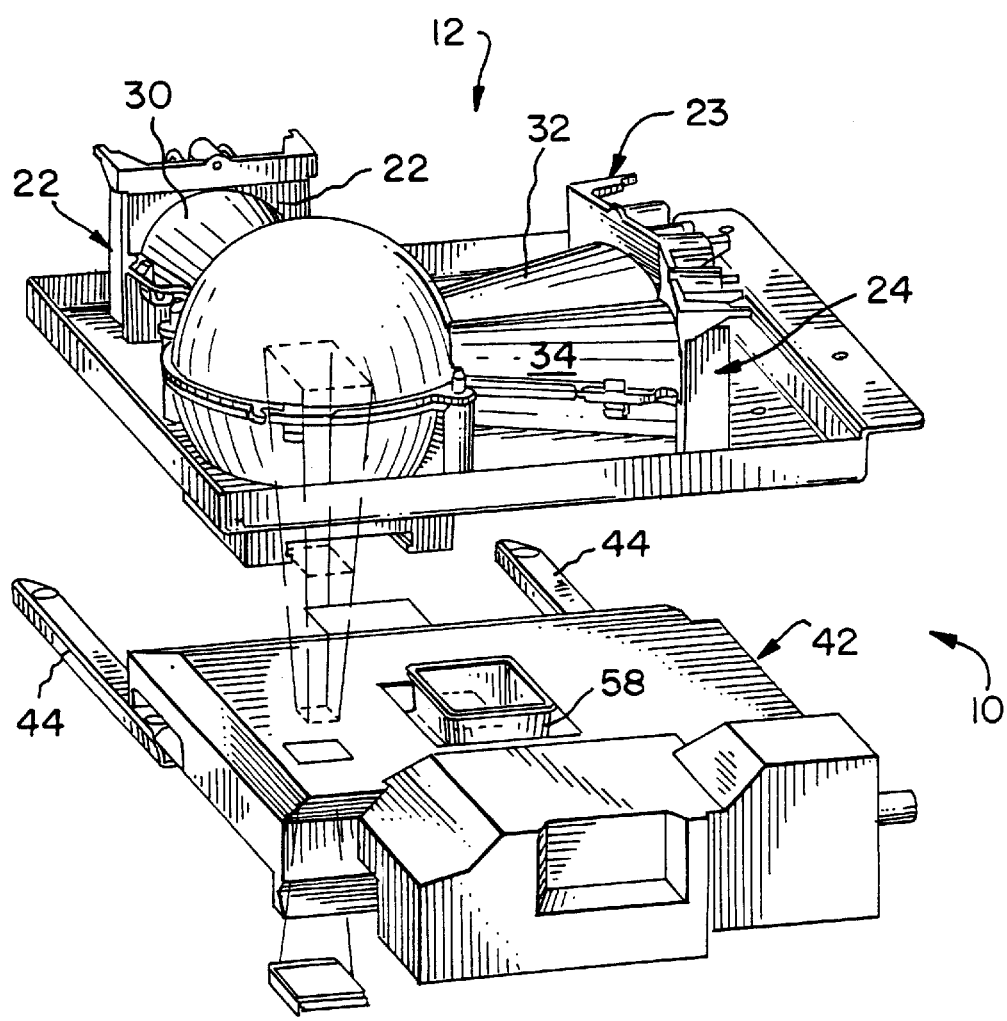
FIG. 2 is an exploded perspective view of the apparatus of FIG. 1 illustrating a slidable print exposure gate.

Referring to the figures, there is illustrated a digital scanner 10 made in accordance to present invention. Scanner 10 includes an illumination system 12 for emitting an exposure light for irradiating a media 14 carried by exposure gate assembly 16. The light transmitted through the media 14 is directed to a sensor 18 through a lens assembly 20 for capturing the image on the media 14. The illumination system 12 is secured to frame 40 of scanner 10.

The illumination system 12 is preferably of the low illumination type. The use of a full-frame, CCD image sensor enables the use of low-light illumination, attainable from currently available LEDs (light emitting diodes) which have many advantages over previous light sources. A scanner using a low-light source is susceptible to exposure errors, such as color and tone, due to ambient room lighting impinging on the media and/or illumination system. Therefore, it is necessary to block out the entry of ambient light by separate means such that the effect of ambient light adds less than one part in 4000 for excellent color tone reproduction. A low light scanner for the purpose of the present invention shall be considered a scanner in which the illumination system brightness is more than 4000 times brighter than the incident ambient light, as measured by the image sensor. In the particular embodiment illustrated, the illumination system 12 comprises three separate low light sources 22, 24 and 26 which in the particular embodiment illustrated are three LED light sources. Each of the light sources 22, 23 and 24 direct its illumination to an integration chamber through respective passageways 30, 32 and 34. The integration chamber 28 receives the light from each of the light sources 22, 23 and 24 and combines them so as to produce a substantially uniform exposure light which is then directed to an exit opening 36 provided in an illumination cap 38 secured to chamber 28.

In the embodiment illustrated, the light sources 22, 23 and 24 each comprise an LED light source. In particular, light source 22 is an LED which produces red light, light source 23 is an LED which produces blue light and light source 24 includes an LED which produces a green light. A suitable red LED is the Marktech MT-5000 UR LED, a suitable green LED is the Nichia NSPG500, and a suitable blue LED is the Nichia NSPB500.

A media 14 is provided at the exit opening 36 by exposure gate assembly 42 which is slidably mounted to frame 40 by a pair of guide rails 44. The guide rails 44 allow for different gate assemblies to be placed at exit opening 36 so that different format media may be presented for exposure to the low illumination exposure light. In the particular embodiment illustrated, the media 14 is a photographic film negative, however, any other media which may be exposed by a light source for transmission onto a CCD array may be provided. In the embodiment illustrated, the gate assembly 42 is designed to receive 35 mm film strips. However, gate assembly 42 may be designed to receive other format films such as, but not by way of limitation, APS (Advanced Photographic System film which has a 24 mm width), 120 or 110 film strip. It is of course understood that any desired format size or type film and/or media may be used which is capable of being exposed onto sensor 18.

Figure 3:
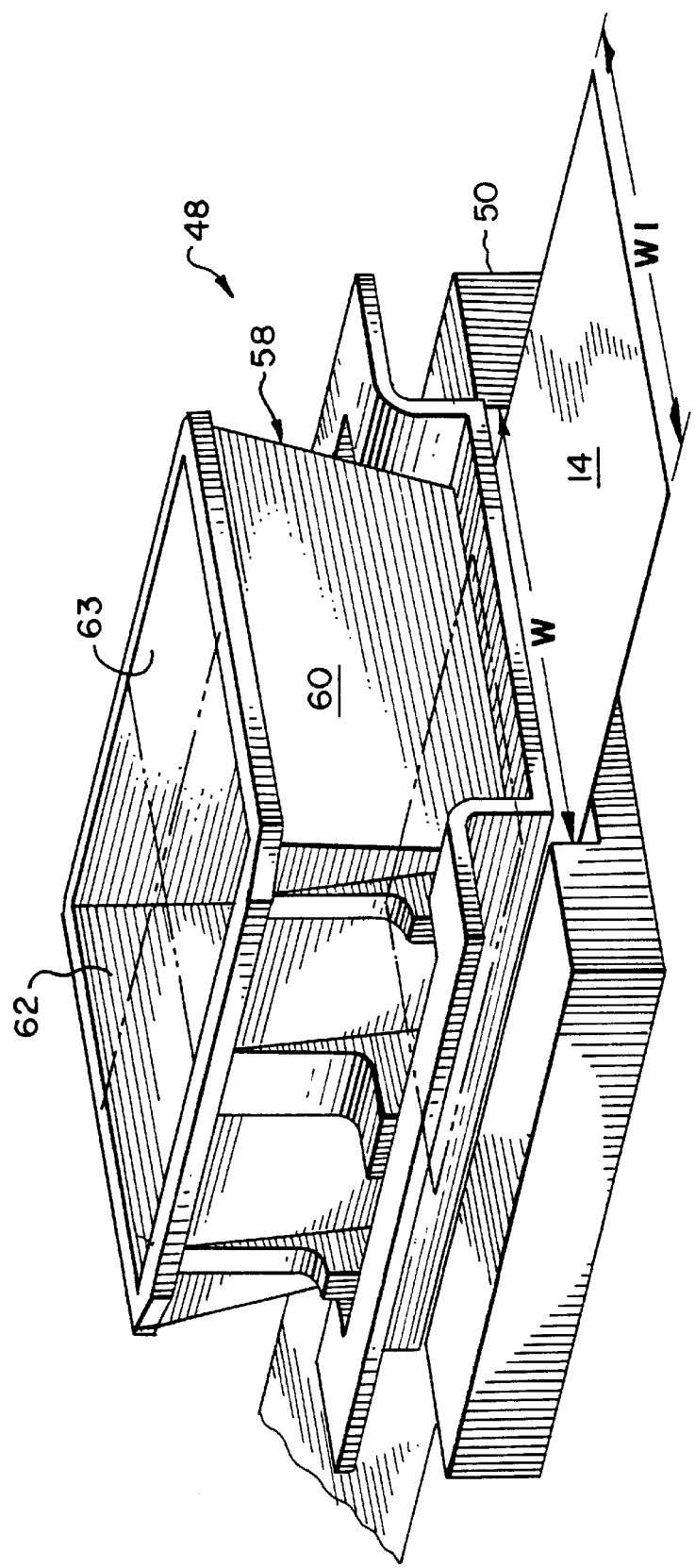
FIG. 3 is a greatly enlarged perspective view of the portion of the exposure assembly for receiving a media illustrating the light conduit in the non-engaged position for allowing the media to move past the exposure aperture.
Figure 4:
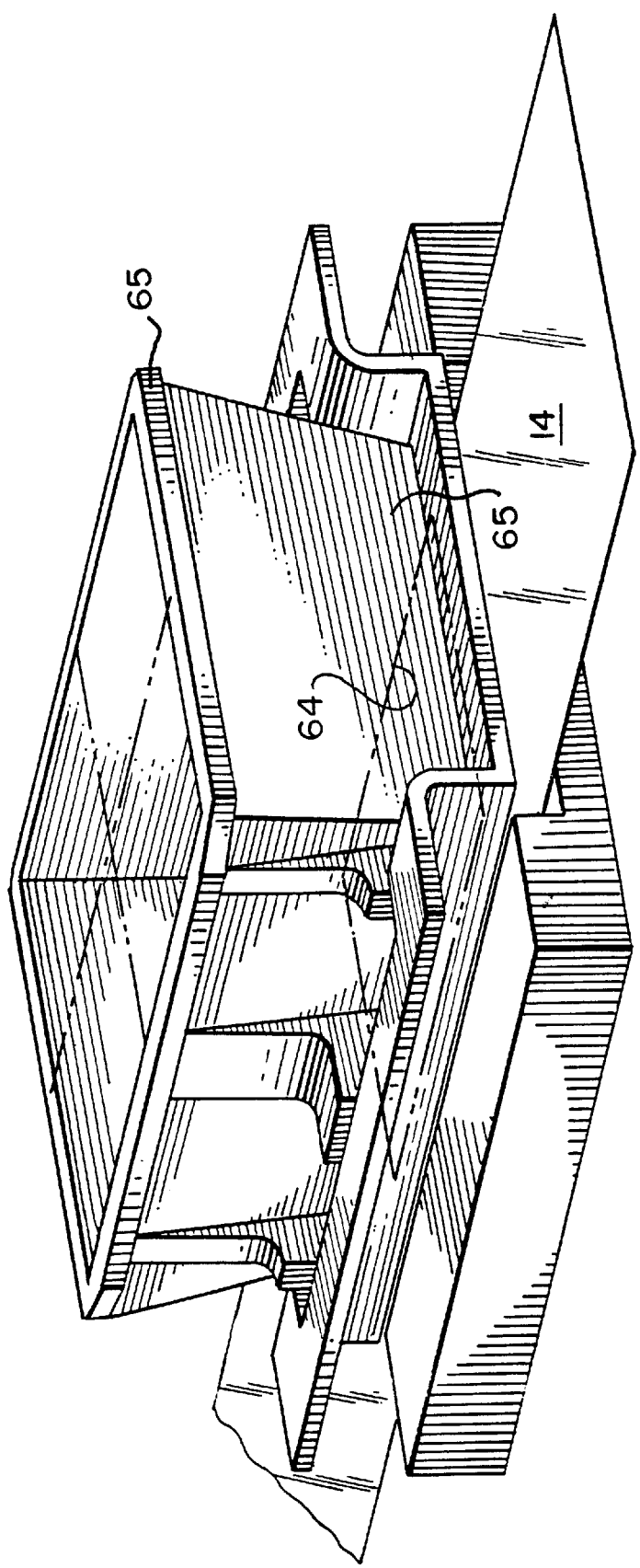
FIG. 4 is a view similar to FIG. 3, illustrating the light conduit in the position for allowing exposure of the media.

The exposure gate assembly 42 includes a main body portion 46 having an exposure assembly 48 which when the gate assembly 42 is properly seated will align with illumination cap 38 such that media 14 presented at the exposure assembly 48 will be exposed to the exposure light being emitted by the illumination system 12. The exposure assembly 48 is designed to easily engage and disengage with illumination system 12 while also minimizing the amount of stray light that may be exposed to the media 14 which is to be illuminated. In particular, the exposure assembly 48 includes a frame member 50 having an exposure aperture 52 which is in optical alignment with the exit opening 36 of illumination cap 38 and with sensor 18. The exposure assembly 48 includes a clamping member 54 for clamping of media 14 at exposure aperture 52 when it is desired to expose the image on the media 14 onto sensor 18. The clamping member 54 is movably mounted to the body portion 46 between an exposure position illustrated in FIG. 4 to a non-exposure position illustrated in FIG. 3. When the clamping member 54 is in the non-exposure position the media 14 is free to move along exposure aperture 52 so that various images formed on media 14 may be individually exposed. In the preferred embodiment illustrated the frame member 50 is provided with a recess section 56 which has a width W slightly larger than the width WI of the media 14 passing therethrough. In the particular embodiment illustrated, the media 14 is a continuous strip of photographic film, having a plurality of images placed adjacent each other as is commonly provided.

The exposure assembly 48 further includes a light conduit 58 which is designed to slidably engage illumination cap 38 and for allowing light to be funneled from exit opening 36 of illumination cap 38 to the exposure aperture 52 while also preventing stray light from reaching the media 14 positioned at the exposure aperture 52. The light conduit 58 comprises an outer wall 60 having a first opening 62 at the upper end 63 adjacent exit opening 36 and a second opening 64 at the lower end 65 adjacent exposure aperture 52. The wall 60 and openings 62 and 64 are designed to substantially surround the area of the media 14 which is to be exposed to the illumination system 12 so as to allow proper exposure of media 14 on to sensor 18. In the particular embodiment illustrated, the outer wall 60 has a generally rectangular configuration which is equal to or slightly larger than the image area on the media 14 to be exposed. The light conduit 58 is secured to clamping member 54 such that as when the clamp member 54 is moved the light conduit 58 will also be moved.

Figure 6:
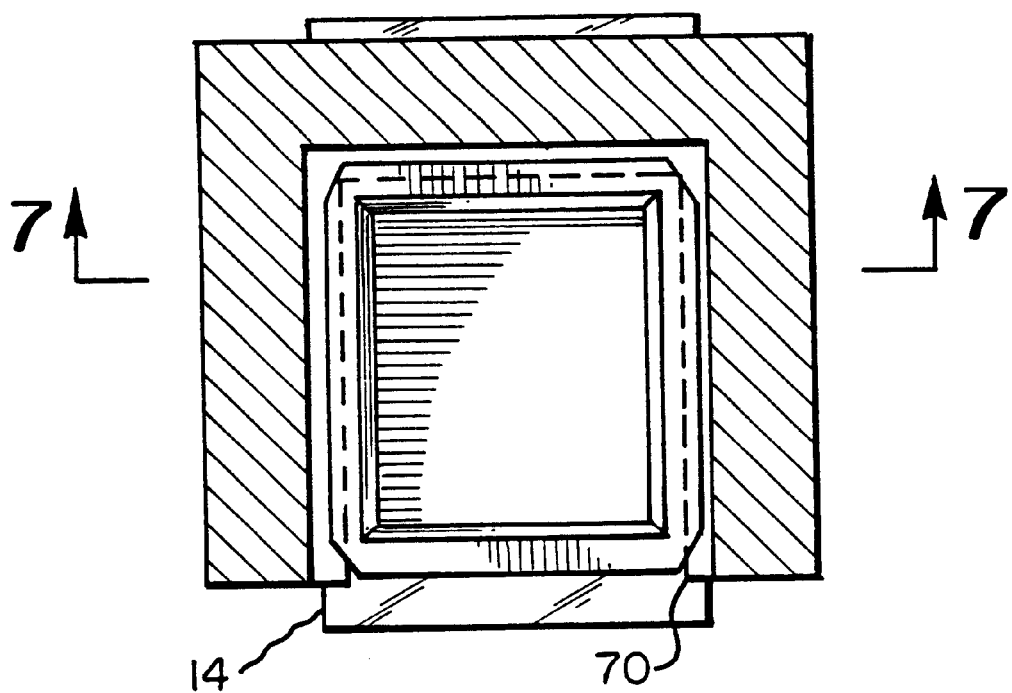
FIG. 6 is an enlarged cross-sectional view of the exposure assembly as taken along line 6—6 of FIG. 1.
Figure 7:
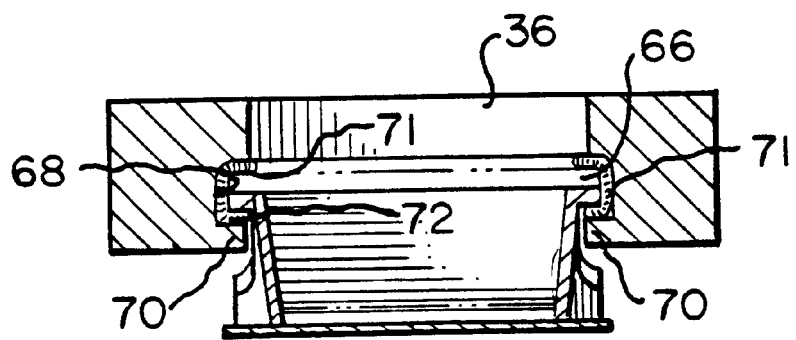
FIG. 7 is a cross-sectional view of the exposure assembly of FIG. 6 as taken along line 7—7.

The upper end 63 of wall 60 adjacent opening 62 is provided with a outwardly extending lip 65 which extends around opening 62 and is designed to engage illumination cap 38. The illumination cap 38 includes a recess 68 which extends below outer surface 69 of cap 38 and fully encompasses exit opening 36. As best illustrated by reference to FIGS. 6 and 7, an inwardly extending lip 70 is provided adjacent exit opening 36 forming channel 71. Lip 70 is coextensive for at least a portion of the length of the outwardly extending lip 66 of light conduit 58. This mating relationship between the lip 65 of conduit 58 and channel 71 minimizes potential stray light from entering through the opening 62 at the upper end 63 of conduit 58. In the embodiment illustrated in FIG. 7, an optional plush 72 (a light lock material typically used in 35 mm film cassette) is provided along sides 10 73, 74 and 75 of channel 71 such that it substantially surrounds the outwardly extending lip 66 of light conduit 58 on at least three sides which further minimizes any potential stray light from entering the light conduit 58. Preferably the height H and width Wc of the channel 71, the size of the outwardly extending lip 65 and plush 72 are designed such that the light conduit 58 may be easily slid in and out of engagement with the illumination cap 38 yet or minimize or eliminate any potential stray light from entering therebetween.

Figure 5:
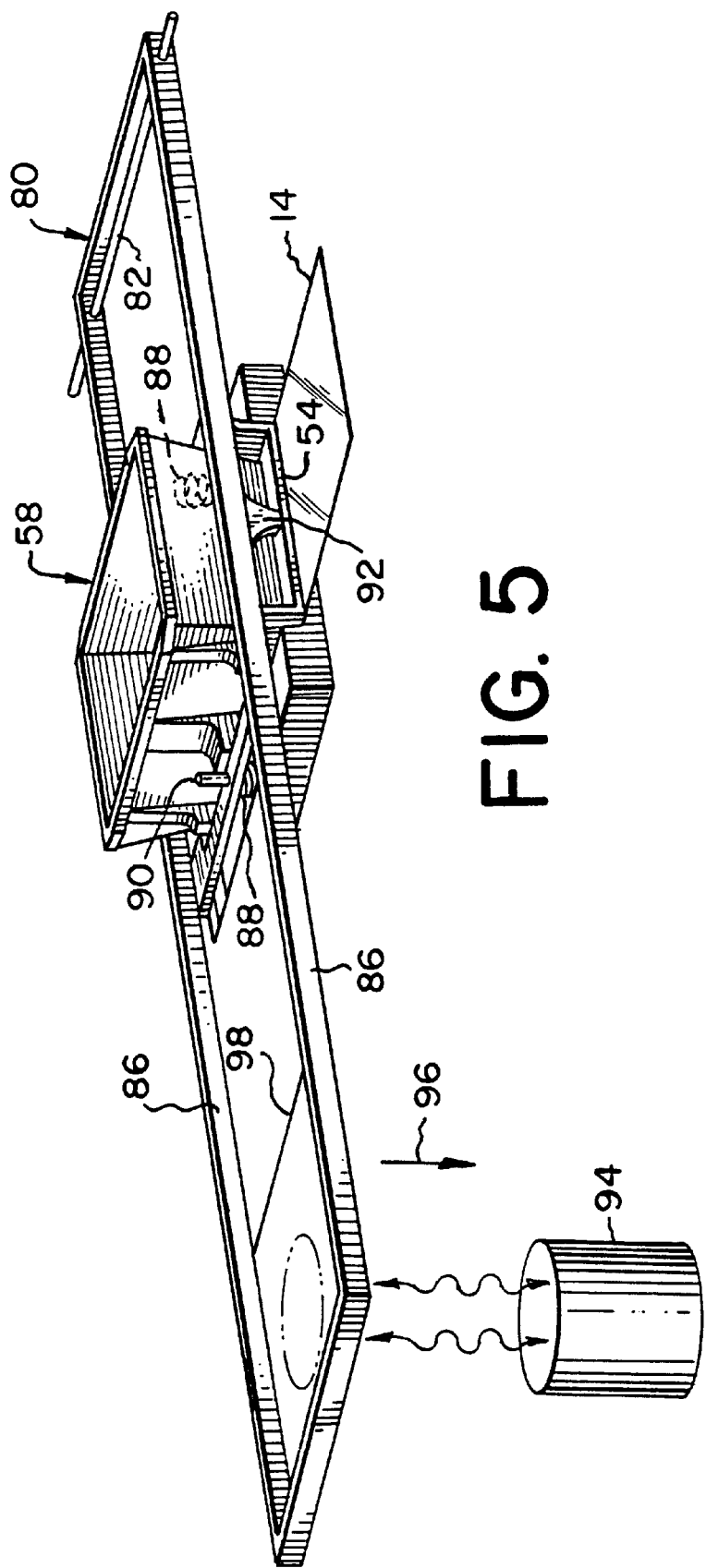
FIG. 5 is a perspective view of the mechanism used for moving of the clamping member illustrated in FIGS. 3 and 4 between the engaged and non-engaged positions.

Referring to FIG. 5, there is illustrated a mechanism by which the light conduit 58 is moved between the engaged and non-engaged positions with respect to media 14. In particular, there is provided an actuation frame 80 which is mounted to body portion 46 by rod 82 which passes through a pair of aligned openings, not shown, in body portion 46. The actuation frame 80 and rod 82 are designed such that relative rotational movement is provided by the actuation frame 80 about rod 82. The frame 80 includes a pair of side rails 86 which engage the upper portion of clamp member 54. A pair of coil springs 88 are provided, one on each side of the light conduit 58 between the clamping member 54 and frame member 50, which bias the clamp member 54 away from frame member 50. The springs 88 are each held in position by a pin 90 which passes through the center of the spring 88 through clamping member 54 and frame 50. The rails 86 are each provided with a projecting member 92 designed to engage the upper surface of clamping member 54. A solenoid 94 is provided for applying an attraction force when solenoid 94 is energized so as to pull the frame 80 downward as indicated by arrow 96 causing the light conduit 58 to be placed in the exposure position illustrated in FIG. 4. The solenoid 94 is attracted to a section 98 of actuation frame 80 which is made of a material capable of being attracted to a solenoid 94 when energized. When solenoid 94 is not energized the springs 88 disengage the clamping member 54 allowing the light conduit 58 to be in the position illustrated by FIG. 3. It is of course understood that any other type of mechanism may be used for moving the conduit 58 between the engaged and non-engaged positions, for example, but not by way of limitation, a cam actuation mechanism, a pneumatic system or hydraulic system.

In the particular embodiment illustrated, the sensor 18 is an area charged couple device (CCD). It is to be understood that the sensor 18 may be of any appropriate type capable of capturing and digitizing images exposed thereon. The image once having been capture by sensor 18 is then forwarded onto an appropriate device for later manipulation printing and/or display as desired and well known to those of ordinary skill in the art of image manipulation.

The lens assembly 20 is appropriately designed to provide the appropriate focus as is well known in customarily done in the prior art and if desired may be of the zoom type configuration for allowing and adjusting for different format media 14 that may be presented by various gate assemblies that may be placed in scanner 10. Thus, when it is desired to provide a gate assembly of a different format, the old exposure gate assembly 42 is removed and a new exposure assembly is provided with the appropriate exposure assembly. This is done by simply sliding out the old gate assembly and sliding in the new gate assembly. As previously discussed, the light conduit and illumination cap are designed to allow for this quick and easy change over while minimizing the amount of stray light that may enter the exposure gate thus allowing use of a low illumination system. Additionally, the present invention minimizes the possibility of dirt entering the area where the film is being exposed and maintains the illumination light within the exposure gate area.

Figure 8:
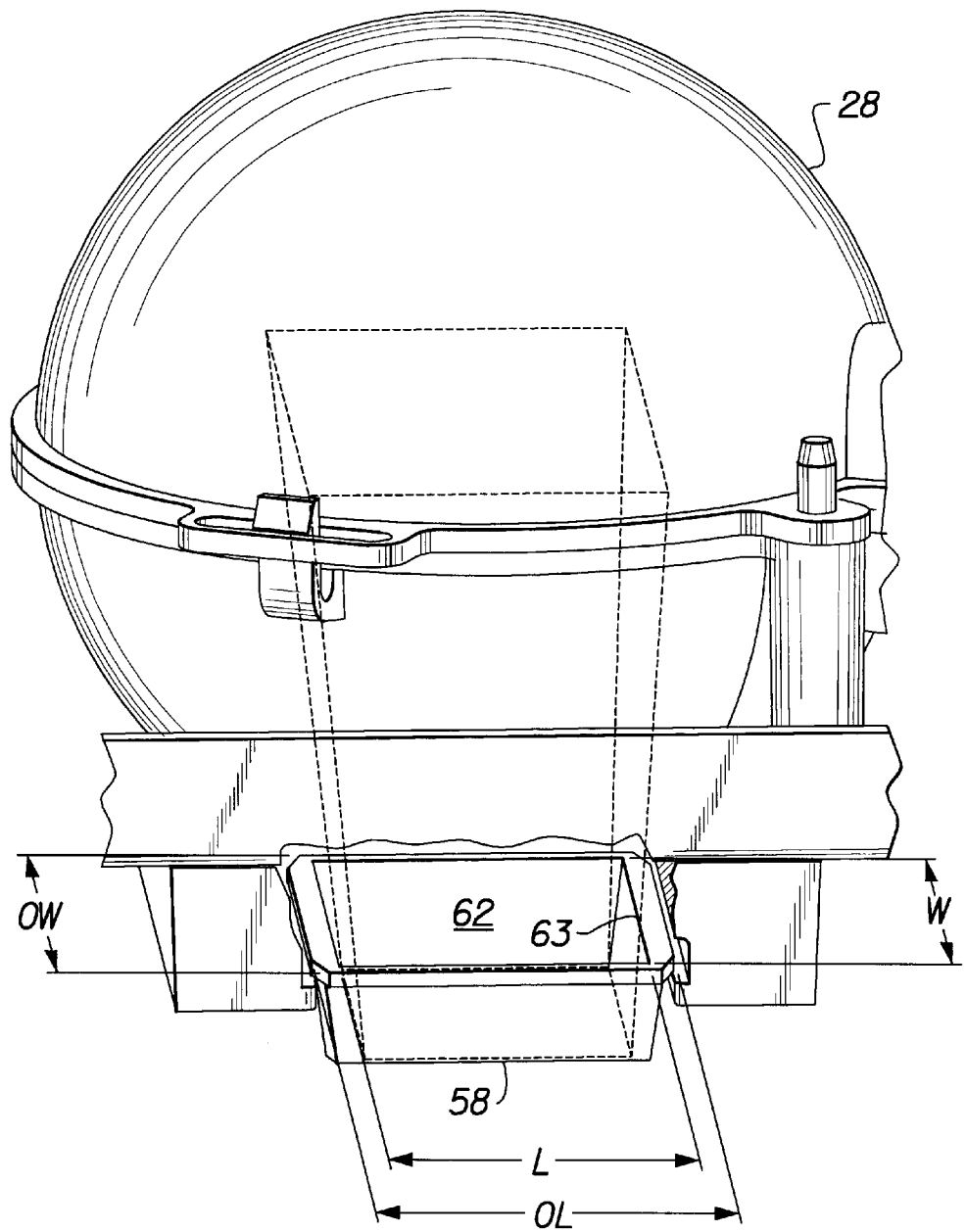
FIG. 8 is An enlarged partial perspective view of the apparatus of FIG. 1.
Figure 9:
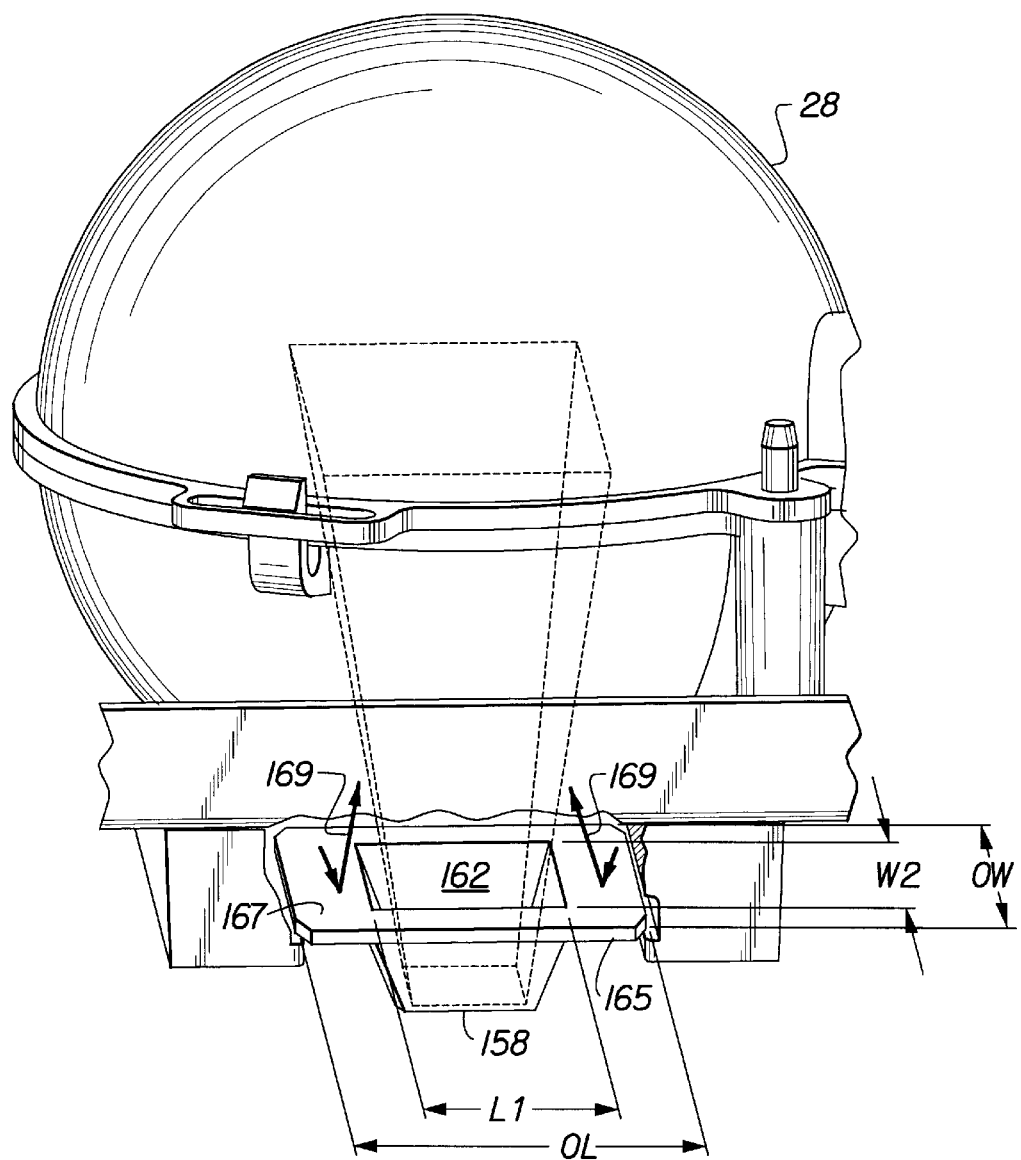
FIG. 9 is a partial perspective view similar to FIG. 8 illustrating a modified snout configuration.

In the embodiment previously described, the opening 62 of upper end 63 is illustrated as single size as shown in FIG. 8. As can be seen opening 62 of conduit 58 has a length L and width W and the outer periphery of the upper end has an outer width OW and outer length OW. When format size films smaller than the largest size format film capable of being exposed are placed at the gate for exposure, the opening 62 of the upper end 63 may be significantly reduced. Applicants have found that the brightness of the light exiting the integration chamber 28 may be substantially improved when exposing smaller format films by providing a modified conduit 158 made in accordance with the present invention such as illustrated in FIG. 8. Conduit 158 is similar to conduit 58, like numerals indicating like parts and operations as previously discussed with respect to conduits 58. In the embodiment of FIG. 9, opening 162, which corresponds to opening 62 of conduit 58, except that it is smaller in size. In particular opening 162 has having a width W1 and length L1 which is substantially less than the width and length W and L, respectively, illustrated in FIG. 8. However, because the outer size of the lip 66 (OW & OL) remains the same for conduit 158, a shelf 165 is provided. The upper surface 167 of shelf 165 is made of a material such that the surface 167 provides reflective surface area whereby a portion of the light exiting the integration chamber hits this surface is reflected back into the integration chamber 28 as indicated by arrows 169. The light that is reflected back into the chamber 28 will result in the exposure light passing through conduit 158 having a higher brightness level than previously provided when the length L and width W of opening 62 were as set forth in FIG. 8. For example, the exit opening 36 of the integration chamber is designed to allow exposure of a 120 mm film, when gate is provided with conduit 168 which is designed for a smaller film size format, for example APS film which has a size of approximately 24 mm, the increase in brightness is such that the exposure time is increased by a factor of about 2. This, of course, increases productivity by allowing faster throughput at the film gate. This increase in brightness may also offset slower scanning times than may be required for digital scanning. The conduit 158 also most efficiently uses the available light for exposure while still allowing different size media to used. In the preferred embodiment illustrated in FIG. 9 the conduit 158 is integrally formed of a single material having reflective properties. The integral construction also results in the inside walls of the conduit being reflective which a also assist in reflecting the light toward the exposure gate. An example of a suitable material is VALOX 310SE-WH1280, (VALOX is a registered trademark of the General Electric Corp.) however, the present invention is not limited to this material. The lip 62 may be made of any suitable reflective. Alternatively, the reflective surface 167 may be provided by providing a layer (or coating) of material having reflective properties thereon.

It is to be understood that various changes and modifications may be made without departing from the scope of the present invention. The present invention being defined by the claim that follows.

PARTS LIST 10 scanner
12 illumination system
14 media
18 sensor
20 lens assembly
22 low light sources
23 low light sources
24 low light sources
28 integration chamber
30,32,34 passage way
36 exit opening
38 illumination cap
40 frame
42 gate assembly
44 guide rails
46 body portion
48 gate assembly
50 frame member
52 exposure aperture
54 clamping member
56 recess section
58 conduit
60 outer wall
62 first opening
63 upper end
64 second opening
66 lip
68 recessed opening
70 lip
72 plush
73,74,75 sides
78 recessed
80 actuation frame
82 rod
86 rails
88 coil springs
90 pin
92 projecting member
94 solenoid
96 arrow
98 section
158 conduit 164 opening
258 conduit
262 opening
265 shelf
267 arrows
268 modified conduit.

What is claimed is:

1. An apparatus for scanning a media, comprising;
a sensor for receiving an exposure of an image;
a low light illumination system for providing an exposure light comprising a low light source and an integration chamber for receiving light from said light source, said integration chamber having an exit opening for allowing said exposure light to exit said integration chamber; and
a gate assembly slidably mounted to said apparatus, said gate assembly having a frame member having an exposure aperture which is in optical alignment with said sensor and said exit opening such that said exposure light will pass through a media positioned at said exposure aperture onto said sensor, a clamp member moveably mounted to said frame member between an exposure position and non-exposure position, and a light conduit mounted to said clamp member, said light conduit having a first opening at one end adjacent said exposure aperture and a second opening at the other end disposed adjacent said exit opening, said first opening having a configuration equal to or greater than said exposure aperture, said second end having an outwardly extending lip which extends around at least a portion of said second opening and having a configuration such it mates within said exit opening, said lip having a reflective surface for reflecting a portion of light back into said integration chamber for increasing of the brightness for exposure onto the media.

2. An apparatus according to claim 1 wherein said exit opening is provided with a receiving channel for receiving and mating with said lip.

3. An apparatus according to claim 2 further comprising means for providing additional light seal along at least a portion of the length of said lip of said light conduit.

4. An apparatus according to claim 3 wherein said light seal comprising a plush.

5. An apparatus according to claim 1 wherein said sensor is an area CCD array.

6. An apparatus according to claim 1 further comprising a lens for focusing the exposure light passing through said exposure aperture on to said sensor.

7. An apparatus according to claim 6 wherein said lens is a zoom lens.

8. An apparatus according to claim 1 wherein said media is photographic film.

9. An apparatus according to claim 1 wherein said clamping member is moved between said exposure position and said non-exposure position by a solenoid.

10. An apparatus according to claim 1 wherein lip is made of a reflective material.

11. An apparatus according to claim 10 wherein said lip is integrally formed as a part of said conduit.

12. An apparatus according to claim 10 wherein reflective material comprises VALOX.

13. An apparatus according to claim 1 wherein said lip is provided with a reflective surface comprises a reflective layer placed on said lip.

14. An apparatus for scanning a media, comprising:
a frame;
a sensor for receiving an exposure of an image;
a low light illumination system for providing an exposure light comprising a low light source and an integration chamber for receiving light from said light source, said integration chamber having an exit opening for allowing said exposure light to exit said integration chamber; and
a gate assembly slidably mounted to apparatus, said gate assembly having a frame member having an exposure aperture which is in optical aligned with said sensor and said exit opening such that said exposure light will pass through a media positioned at said exposure aperture on to said sensor, a clamp member moveably mounted to said frame member between an exposure position and non-exposure position, and a light conduit mounted to said clamp member, said light conduit having a first opening at one end adjacent said exposure aperture and a second opening at the other end disposed adjacent said exit opening, said first opening having a configuration equal to or greater than said exposure aperture, said second end having an outwardly extending lip which extends around at least a portion of said second opening and having a configuration such it mates within said exit opening, said lip having a reflective surface for reflecting a portion of light back into said integration chamber for increasing of the brightness for exposure onto the media.

15. An apparatus according to claim 14 wherein said lip is made of a reflective material.

16. An apparatus according to claim 15 wherein said reflective material comprises VALOX.

17. An apparatus according to claim 14 wherein said lip is integrally formed as a part of said conduit.

18. An apparatus according to claim 14 wherein said lip is provided with a reflective surface comprises a reflective layer placed on said lip.

* * * * *